(12) United States Patent
Chen et al.

(10) Patent No.: US 8,179,354 B2
(45) Date of Patent: May 15, 2012

(54) LIQUID CRYSTAL DISPLAY PANEL AND LIQUID CRYSTAL DISPLAY APPLYING THE SAME

(75) Inventors: Ying-Ru Chen, Hsinchu (TW);
Ching-Huan Lin, Hsinchu (TW);
Chih-Ming Chang, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 886 days.

(21) Appl. No.: 12/202,438

(22) Filed: Sep. 2, 2008

(65) Prior Publication Data
US 2009/0109160 A1    Apr. 30, 2009

(30) Foreign Application Priority Data
Oct. 25, 2007  (TW) ............................... 96140043 A

(51) Int. Cl.
*G09G 3/36* (2006.01)
(52) U.S. Cl. ......................................... 345/98; 349/139
(58) Field of Classification Search ............ 345/87–104, 345/204; 349/84, 139–152
See application file for complete search history.

(56) References Cited

U.S. PATENT DOCUMENTS

| | | | |
|---|---|---|---|
| 6,977,704 B2 | 12/2005 | Kataoka | |
| 7,113,241 B2 | 9/2006 | Hanaoka | |
| 2003/0067579 A1* | 4/2003 | Inoue et al. | 349/187 |
| 2006/0186913 A1* | 8/2006 | Kim | 324/770 |

FOREIGN PATENT DOCUMENTS
CN    1403859    3/2003
* cited by examiner

*Primary Examiner* — Stephen Sherman
(74) *Attorney, Agent, or Firm* — Jianq Chyun IP Office

(57) ABSTRACT

A liquid crystal display panel including a first substrate, a second substrate, scan lines, data lines, pixel unit sets, and a liquid crystal layer is provided. The scan lines, data lines, and pixel unit sets are disposed on the first substrate. A first gap is formed between two adjacent pixel unit sets. Each of the pixel unit sets includes pixel units, and a second main space is formed between two adjacent pixel units. Each of the pixel units includes an active device electrically connected to a scan line and a data line, and a transparent pixel electrode has slits and electrically connected to the active device. The width of the first gap is greater than that of the second gap.

13 Claims, 7 Drawing Sheets

LIQUID CRYSTAL DISPLAY PANEL AND LIQUID CRYSTAL DISPLAY APPLYING THE SAME

CROSS-REFERENCE TO RELATED APPLICATION

This application claims the priority benefit of Taiwan application serial no. 96140043, filed on Oct. 25, 2007. The entirety of the above-mentioned patent application is hereby incorporated by reference herein and made a part of specification.

BACKGROUND OF THE INVENTION

1. Field of the Invention

The present invention relates to a liquid crystal display (LCD) panel. More particularly, the present invention relates to an LCD panel using polymer-stabilized alignment and a display applying the same.

2. Description of Related Art

Along with the great progress of computer performance and high development of internet and multi-media techniques, the volume of video or image apparatuses gradually becomes lighter and thinner. As for displays, since the progress in photoelectric technology and semiconductor manufacturing technology, LCD apparatuses having advantages of high display quality, good space utilization, low power consumption, and no radiation have gradually become mainstream displays in the market.

The LCD apparatus includes a backlight module and an LCD panel, and a conventional LCD panel is constituted by two substrates and a liquid crystal layer filled between the two substrates. Generally speaking, during the manufacturing of the LCD panel, an alignment film is formed on the two substrates, such that liquid crystal molecules have a certain arrangement. A conventional method of forming the alignment film involves first coating an alignment material, and then performing an alignment process on the alignment material. The alignment process may be divided into a contact alignment process and a non-contact alignment process. Though the non-contact alignment process can solve problems of electrostatics and particle contamination caused by the contact rubbing alignment, the problem of insufficient anchoring energy of the alignment surface often occurs, which will lead to a poor display quality of the LCD panel.

In order to solve the above problem, a technique of polymer-stabilized alignment (PSA) has been set forth. In this technique, monomers of certain concentration are added into the liquid crystal and then uniformly oscillated. Then, the mixed liquid crystal is placed on a heater and heated to assume an isotropy state. After that, when the temperature of the liquid crystal mixture drops to the room temperature (25° C.), the liquid crystal mixture returns to a nematic state. At this time, the liquid crystal mixture is injected into a liquid crystal cell and is applied with a voltage. When the voltage is applied to stabilize the arrangement of the liquid crystal, a UV light is used to make the monomers formed a polymer layer, thereby achieving the purpose of stabilized alignment.

Further, in order to obtain a stable and uniform liquid crystal domain when a voltage is applied, fine slits must be designed on a pixel electrode. By arranging the fine slits in different directions, a multi-domain arrangement may be achieved after the above processes, such that the LCD panel obtains a display effect of wide viewing angle. Generally speaking, the design of the fine slits on the pixel electrode is optimized in terms of shape, position, and quantity, so as to achieve a preferred liquid crystal arrangement. However, as a higher resolution requires a smaller sized pixel unit of the LCD panel, the design of the fine slits is restricted by the limited area of the pixel electrode and the limitation of the process capability. For example, the alignment direction of the fine slits on the pixel electrode may be reduced accordingly, which will adversely affect the display effect of wide viewing angle of the LCD panel.

SUMMARY OF THE INVENTION

The present invention is directed to an LCD panel, for providing a high design tolerance of the fine slits under a high resolution requirement and limited process capability, thereby achieving the display effect of wide viewing angle.

The present invention is further directed to an LCD apparatus, which adopts the aforementioned LCD panel, thereby achieving a better display effect of wide viewing angle.

As embodied and broadly described herein, the present invention provides an LCD panel comprising a first substrate, a plurality of scan lines disposed on the first substrate; a plurality of data lines disposed on the first substrate and respectively intersected with the plurality of scan lines; a plurality of pixel unit sets, disposed on the first substrate and each pixel unit set comprising at least two pixel units, wherein the pixel units are defined by the substantially intersected scan lines and data lines; a second substrate disposed above the first substrate; and a liquid crystal layer disposed between the first substrate and the second substrate. Each of the pixel units comprises an active device electrically connected to one of the scan lines and one of the data lines; and a transparent pixel electrode electrically connected to the active device and comprising a plurality of slits. A first gap is located between the transparent pixel electrodes of the two adjacent pixel unit sets, a second gap is located between the transparent pixel electrodes of the two adjacent pixel units in each pixel unit set, and the width of the first gap is greater than that of the second gap.

In an embodiment of the present invention, a part of the slits in each pixel unit are connected to the corresponding second gap.

In an embodiment of the present invention, the slits are arranged symmetrically with respect to the corresponding second gap in each of the pixel unit sets.

In an embodiment of the present invention, the slits in each pixel unit set are arranged symmetrically with respect to an axis being perpendicular to the first gap and the second gap. The angles between the plurality of slits and the axis or the angles between the extension of the plurality of slits and the axis may be in the range of 0 degree to 90 degree or in the range of 0 degree to 45 degree, for example, 0 degree or 45 degree.

In an embodiment of the present invention, each of the pixel unit sets comprises a first pixel unit and a second pixel unit. The slits of the first pixel unit and the slits of the second pixel unit are arranged symmetrically with respect to the corresponding second gap there-between.

In an embodiment of the present invention, each of the pixel unit sets comprises a first pixel unit, a second pixel unit, a third pixel unit, and a fourth pixel unit arranged in sequence. The slits of the second pixel unit and the slits of the third pixel unit are arranged symmetrically with respect to the second gap there-between. The slits of the first pixel unit and the slits of the fourth pixel unit are arranged symmetrically with respect to the second gap between the second pixel unit and the third pixel unit.

In an embodiment of the present invention, the LCD panel further comprises at least one polymer layer disposed on at least one of the first substrate and the second substrate, wherein the polymer layer is made from the monomers added in the liquid crystal layer treated by a UV curing or heat curing process.

In an embodiment of the present invention, the LCD panel further comprises at least one alignment layer disposed at least between the first substrate and the polymer layer or between the second substrate and the polymer layer.

In an embodiment of the present invention, each of the pixel units further comprises a reflective pixel electrode electrically connected to the corresponding active device. Furthermore, the reflective pixel electrode and the transparent pixel electrode of each pixel unit may be respectively corresponding to different cell gaps.

An LCD apparatus adopting the aforementioned LCD panel is also provided. The LCD apparatus includes a backlight module and the LCD panel. The LCD panel is disposed above the backlight module, and uses a backlight source provided by the backlight module as a display light source.

The present invention adopts the above design, thus providing a high design tolerance of the fine slits. The display quality of the LCD apparatus is improved.

In order to make the aforementioned and other objectives, features, and advantages of the present invention comprehensible, embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

The present invention is applicable to an LCD panel fabricated by the PSA process. A plurality of pixel unit sets is divided by designing the width of the gap between the pixel units, and the slits of different pixel units in the same pixel unit set are designed, thereby achieving a multi-domain alignment effect through the combination of the pixel units in the polymer-stabilized alignment (PSA) process. In detail, though the design of the slits on a pixel electrode may be restricted by the limited area of the pixel electrode and the limitation of the process capability, which will result in a decrease of the quantity and alignment direction of the slits in a single pixel unit, the present invention integrates a plurality of pixel units to achieve a desired alignment effect. In other words, the present invention can provide a high design tolerance of the slits under the high resolution requirement and limited process capability, thereby achieving the display effect of wide viewing angle.

The embodiments are given below for illustrating, instead of limiting, the design of the present invention. Those skilled in this field can make modifications according to actual requirements with reference to the following disclosure of the present invention without departing from the scope of the present invention.

Figure 1:
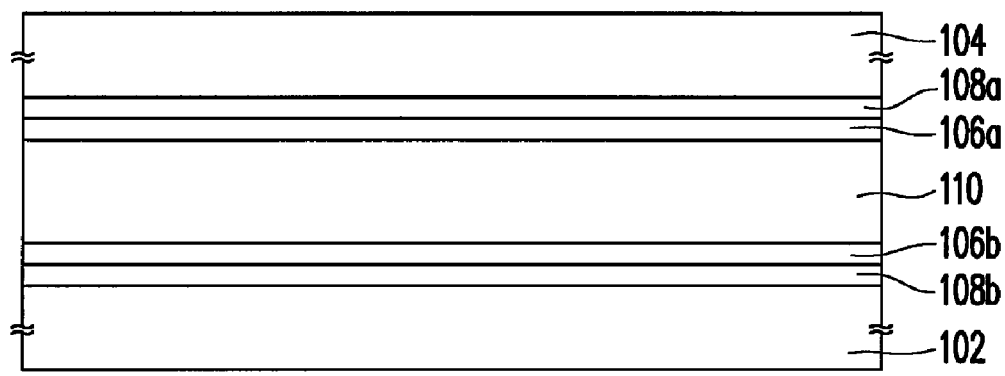
FIG. 1 is a cross-sectional view of an LCD panel according to an embodiment of the present invention.

FIG. 1 is a cross-sectional view of an LCD panel according to an embodiment of the present invention.

The LCD panel 100 fabricated by the PSA process includes a first substrate 102, a second substrate 104, a first polymer layer 106a, a second polymer layer 106b, and a liquid crystal layer 110.

The second substrate 104 is disposed above the first substrate 102 and may be a color filter substrate or a substrate with only a common electrode layer. The material of the first substrate 102 and the second substrate 104 is, for example, glass, plastic, or other suitable materials. The liquid crystal layer 110 is interposed between the first substrate 102 and the second substrate 104 and consists of liquid crystal molecules and monomers.

Typically, the liquid crystal layer 110 is treated by UV curing or heat curing process. During the curing process, the monomers may be partially or fully polymerized to form the first polymer layer 106a and the second polymer layer 106b. The first polymer layer 106a and the second polymer layer 106b are respectively formed on the second substrate 104 and on the first substrate 102, like FIG. 1 shown. It should be noted that the polymer layer may also be formed only on the substrates 102 or 104 (not shown in the figure).

In this embodiment, in order to further improve the alignment performance, the LCD panel 100 further includes a first alignment layer 108a and a second alignment layer 108b. The first alignment layer 108a and the second alignment layer 108b are respectively disposed on the second substrate 104 and the first substrate 102, i.e., respectively disposed between the second substrate 104 and the polymer layer 106a and between the first substrate 102 and the polymer layer 106b. In this embodiment, alignment layers are disposed on both the second substrate 104 and the first substrate 102. It should be noted that an alignment layer may not be disposed, or disposed only on the second substrate 104 or the first substrate 102 according to the actual requirements.

Figure 2:
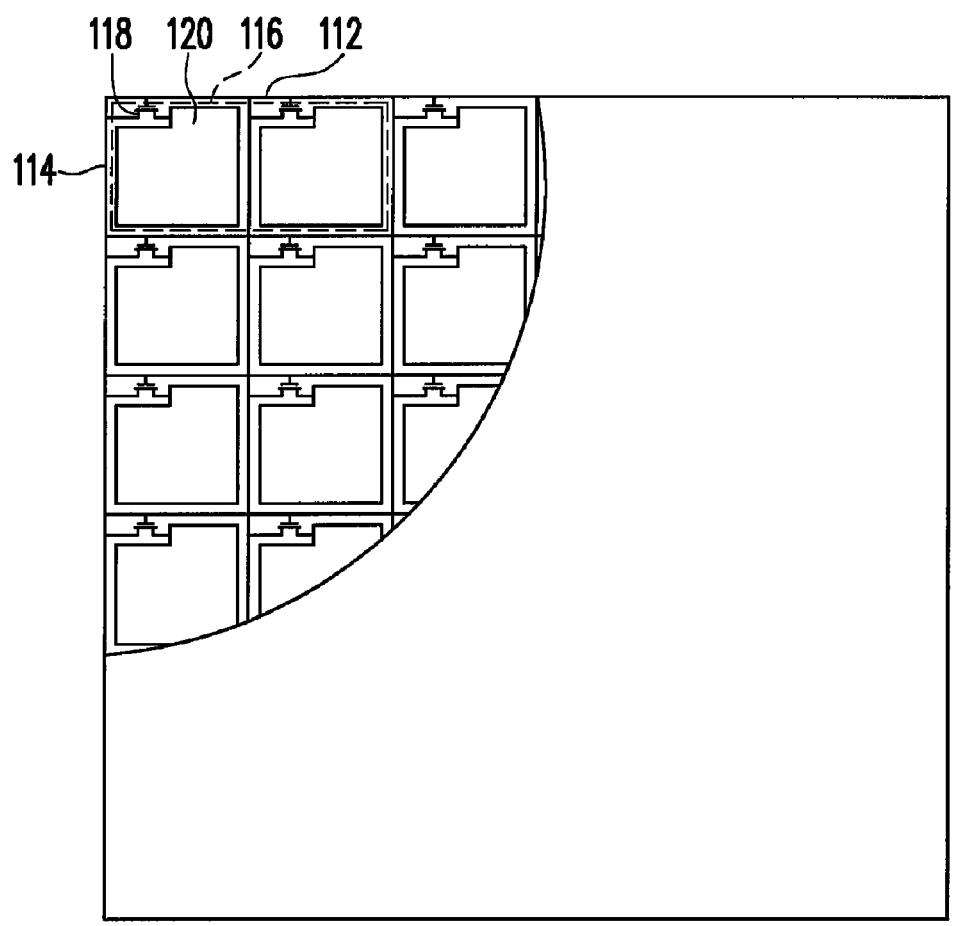
FIG. 2 is a partial top view of a first substrate of the LCD panel of FIG. 1.
Figure 3:
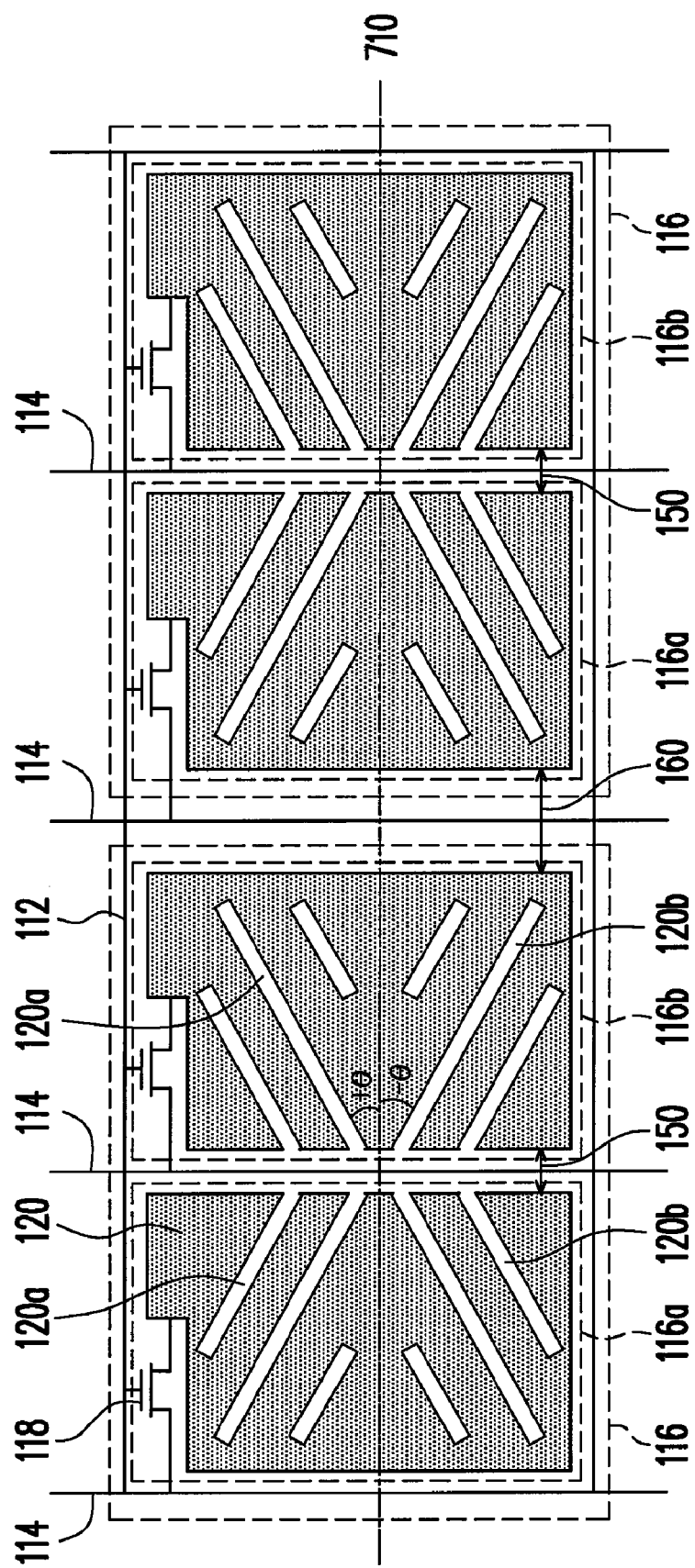
FIG. 3 shows a pixel unit on the first substrate.

FIG. 2 is a partial top view of a first substrate of the LCD panel in FIG. 1, and FIG. 3 shows pixel units on the first substrate. For simplifying illustration, film layers such as a probable dielectric layer and channel layer are omitted in FIG. 3. However, the actual positions and functions of those omitted film layers could be deduced by those skilled in this field according to the disclosure of this embodiment and with reference to the conventional art, and the details will not be described herein again.

Referring to FIG. 2 and FIG. 3 together, a plurality of scan lines 112, a plurality of data lines 114, and a plurality of pixel unit sets 116 are disposed on the first substrate 102. The data lines 114 and the scan lines 112 are perpendicularly intersected to each other to form a plurality of pixel units. In detail, each pixel unit includes an active device 118 and a transparent pixel electrode 120, in which the active device 118 is driven by the corresponding scan line 112 and data line 114, and inputs a driving voltage to the transparent pixel electrode 120. Further, each transparent pixel electrode 120 has a plurality of first slits 120a and second slits 120b. The first slits 120a and second slits 120b are arranged in the first part and the second part of the pixel electrode 120. The first slits 120a and second slits 120b are arranged as mirror images of each other in the each pixel unit, so that the first slits 120a and second slits 120b have the symmetrical tilted angles with respect to an axis 710 which also divided the transparent pixel electrode 120 into a first part and a second part. Furthermore, in other embodiments, some slits (not shown) may be located on the axis 710. In this embodiment, the first slits 120a have a tilted angle of +θ with respect to the axis 710 and then the second slits 120b have a tilted angle of −θ with respect to the axis 710. It is also obtained in the contrary i.e. the first slits 120a have a tilted angle of −θ and the second slits 120b have a tilted angle of +θ. The tilted angle is in the range of from 0 degree to 90 degree, preferred from 45 degree to 0 degree. In this embodiment, the first slits 120a have a tilted angle of +45 degree with respect to the axis 710 and then the second slits 120b have a tilted angle of −45 degree with respect to the axis 710. Each pixel unit set 116 includes two adjacent pixel units 116a and 116b. In this embodiment, the active device 118 is, for example, a thin film transistor (TFT). Definitely, in other embodiments, the active device 118 may also be a bipolar transistor or other three-terminal active devices. The material of the scan lines 112 and the data lines 114 is, for example, a metal material such as Cr, Ta, or other suitable conductive materials. Moreover, the material of the transparent pixel electrode 120 may be indium tin oxide (ITO), indium zinc oxide (IZO), or other transparent conductive materials.

In this embodiment, there is a second gap 150 between the two adjacent pixel units 116a and 116b in each pixel unit set 116, and there is a first gap 160 between the two adjacent pixel unit sets 116 in the same row, wherein the axis 710 is perpendicular to the first gaps 160 and the second gap 150. In detail, a first space 160 is located between the transparent pixel electrodes 120 on the pixel units at the adjacent sides of two adjacent pixel unit sets 116. A second space 150 is located between the transparent pixel electrodes 120 on the two pixel units 116a, 116b in each pixel unit set 116. The first gap 160 and the second gap 150 are also arranged parallel to the data lines 114 and parallel to each other. Here, the width of the first space 160 is wider than that of the second gap 150, such that the tilted directions of the liquid crystal molecules on different pixel unit sets 116 are distinguished. According to this embodiment, in each pixel unit set 116, the first slits 120a of the transparent pixel electrodes 120 on the two adjacent pixel units 116a, 116b are arranged symmetrically with respect to the second gap 150 serving as a symmetrical axis. Also, the second slits 120b of the transparent pixel electrodes 120 on the two adjacent pixel units 116a, 116b are arranged symmetrically with respect to the second gap 150 serving as a symmetrical axis.

In this embodiment, some of the first slits 120a and the second slits 120b are connected to the corresponding second space 150. That is, some of first slits 120a and the second slits 120b penetrate through the boundary line of the transparent pixel electrode 120 to become the opened slits. However, it should be noted that the first slits 120a and the second slits 120b may not be connected to the second space 150. That is, the first slits 120a and the second slits 120b are still the closed slits.

According to this embodiment, each pixel unit set 116 includes two pixel units 116a, 116b. The first slits 120a and the second slit 120b of the transparent pixel electrode 120 are arranged as mirror images of each other in each pixel unit 116a, the first slits 120a in the same pixel unit set 116 are arranged symmetrically with respect to the second gap 150 serving as a symmetrical axis, and also the second slits 120b in the same pixel unit set are arranged symmetrically with respect to the second gap 150 serving as a symmetrical axis. Therefore, the liquid crystal molecules (not shown) in the liquid crystal layer 110 on each pixel unit set 116 have four tilted directions. That is, there are four domains in each pixel unit set 116.

Figure 4:
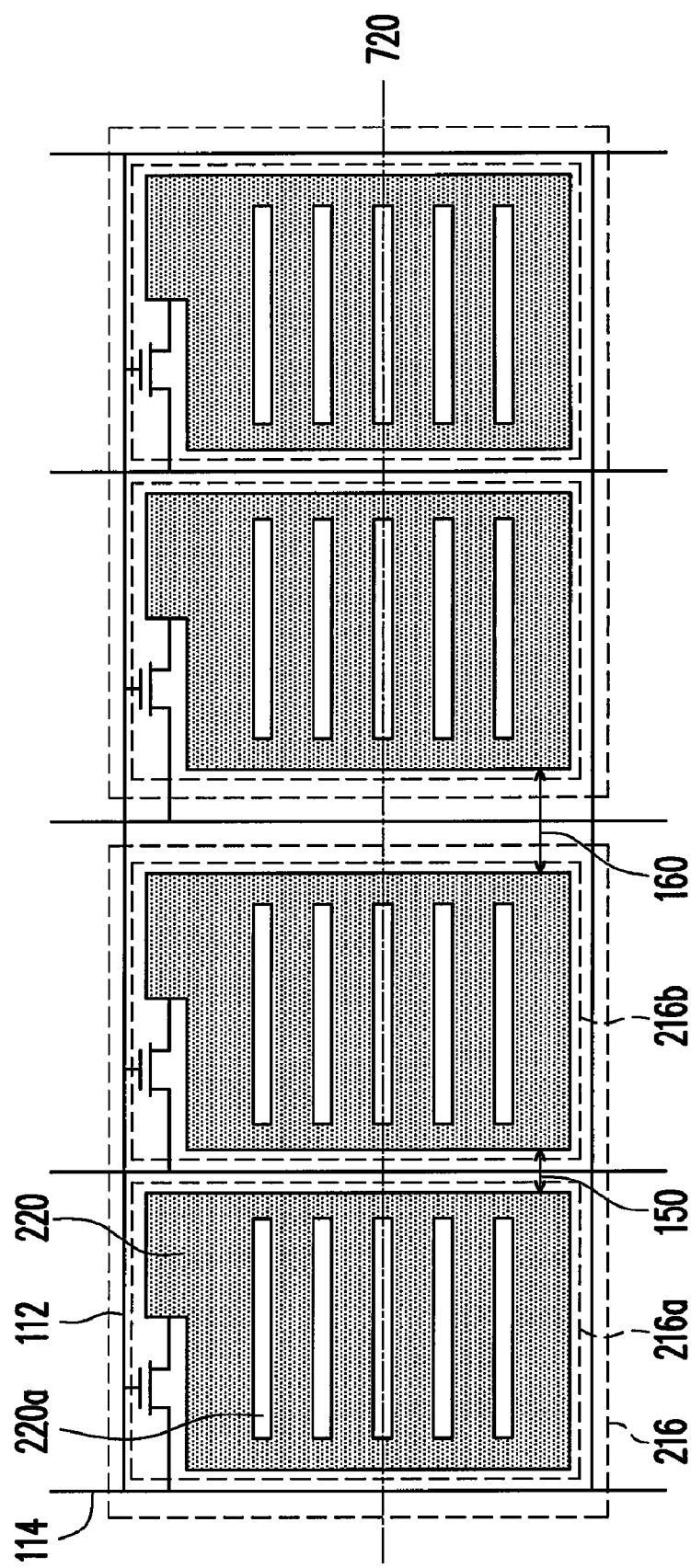
FIG. 4 is a top view of a pixel unit according to another embodiment of the present invention.

In the above embodiment, the first and second slits of the transparent pixel electrode of each pixel unit extend in two directions respectively. However, according to another embodiment, the first and second slits of the transparent pixel electrode of each pixel unit are aligned in only one direction when the titled angle is 0 degree with respect to the axis. Therefore, all of the first slits and second slits in each pixel unit become into the slits numbering "220a" in the FIG. 4. Referring to the FIG. 4, the slits 220a of the two pixel units 216a in each pixel unit set 216 extend in a horizontal direction with respect to the axis 720. The structure and function of the pixel unit and the pixel unit set in FIG. 4 are similar to those of the pixel unit and the pixel unit set in FIG. 3, so only the differences will be described below. The slits 220a of the transparent pixel electrode 220 on each of the two pixel units 216a, 216b in each pixel unit set 216 extend in only one direction, and are arranged symmetrically with respect to the second gap 150 serving as a symmetrical central axis. Therefore, the liquid crystal molecules (not shown) in the liquid crystal layer on each pixel unit set 216 have two tilted directions. That is, there are two domains in each pixel unit set 216.

Figure 5:
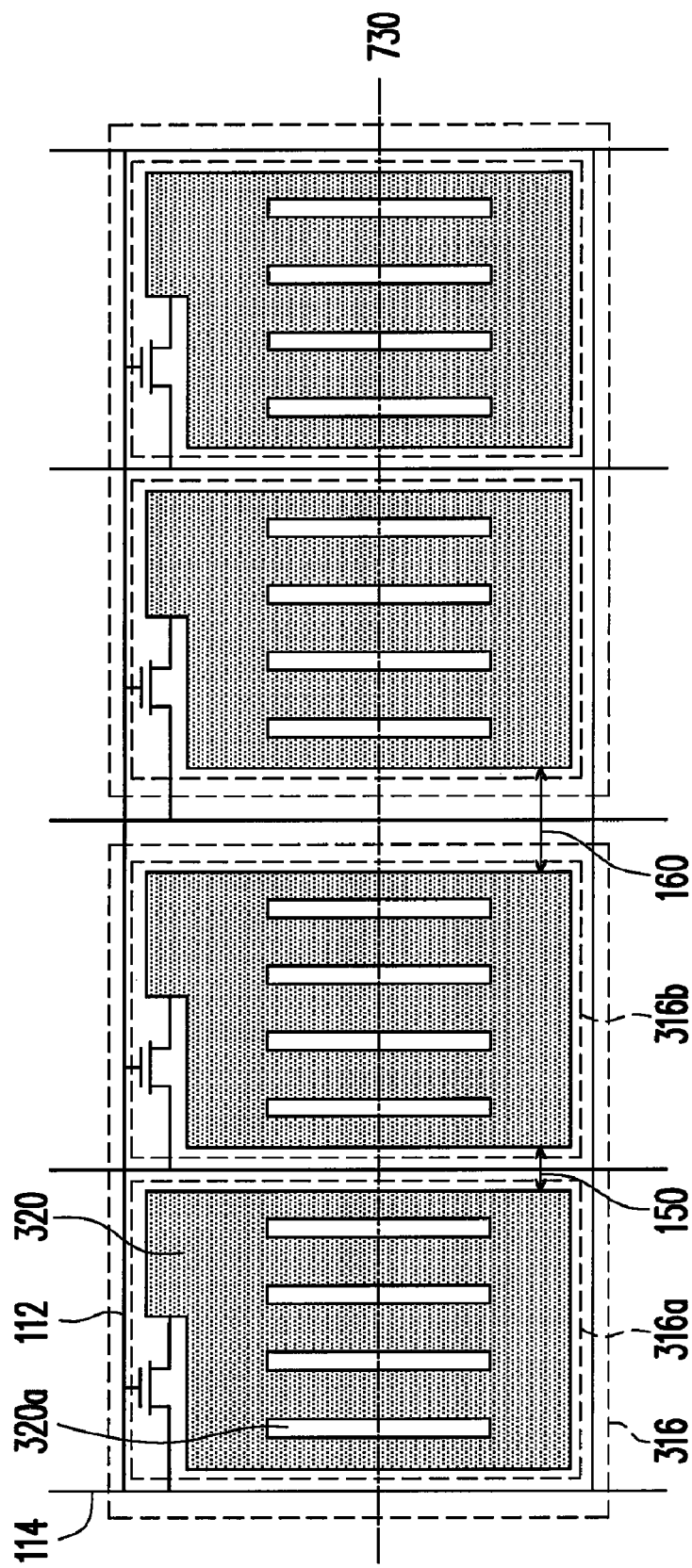
FIG. 5 is a top view of a pixel unit according to still another embodiment of the present invention.

However, in another embodiment of the present invention, the first and second slits of the transparent pixel electrode of each pixel unit are aligned in only one direction when the titled angle is 90 degree with respect to the axis. That is, the slits of the two pixel units in each pixel unit set extend in a vertical direction with respect to the axis. FIG. 5 is a top view of a pixel unit according to still another embodiment of the present invention. The structure and function of the pixel unit in FIG. 5 are similar to those of the pixel unit in FIG. 4, so only the differences will be described below. Referring to FIG. 5, the slits 320a of the transparent pixel electrode 320 on each of the two pixel units 316a, 316b in each pixel unit set 316 extend in a vertical direction with respect to the axis 730. It should be noted that though one or two extending directions are illustrated as an example in the above embodiments, the alignment direction of a single pixel unit may also be three or more according to practical requirements.

Further, as the arrangement of the pixel colors has a certain variation, in order to meet such variation and achieve a more uniform display effect, the present invention is not limited to integrate two pixel units as a set. For example, the pixel units may be arranged into sets and each set has four pixel units in a row, in a column, or in an array. The alignment direction of a single pixel unit in each group may be one, two, or more.

Figure 6:
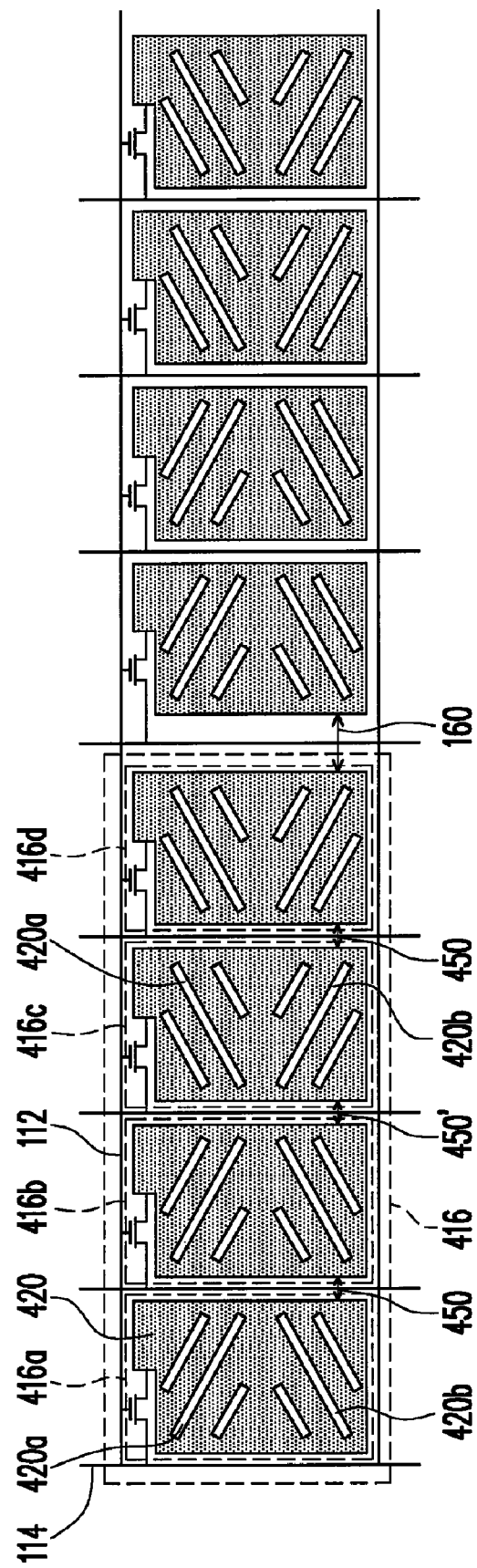
FIG. 6 is a top view of a pixel unit according to another embodiment of the present invention.

FIG. 6 is a top view of a pixel unit according to another embodiment of the present invention. Each of the pixel sets 416 has four pixel units 416a, 416b, 416c, and 416d in a row. The structure and function of the pixel unit in FIG. 6 are similar to those of the pixel unit in FIG. 3, so only the differences will be described below. Referring to FIG. 6, in each pixel unit set 416, there are three second gap 450 located between the four neighboring pixel units 416a, 416b, 416c, and 416d. The first slits 420a of the transparent pixel electrode 420 on each of the four pixel units 416a, 416b, 416c, and 416d extend in two directions symmetrically with respect to the second gap 450' which is between the second pixel unit and the third pixel unit. The second slits 420b of the transparent pixel electrode 420 on each of the four pixel units 416a, 416b, 416c, and 416d also extend in two directions symmetrically with respect to the second gap 450'. Here, the pattern of the first slits 420a of the pixel unit 416a and of the pixel unit 416d is symmetrical, and the pattern of the first slits 420a of the pixel unit 416b and of the pixel unit 416c is symmetrical. Moreover, the pattern of the second slits 420b of the pixel unit 416a and of the pixel unit 416d is symmetrical, and the pattern of the second slits 420b of the pixel unit 416b and of the pixel unit 416c is symmetrical.

According to this embodiment, each pixel unit set 416 has four pixel units. The slits of each pixel unit extend in two directions, and in each pixel unit set 416, the pattern combination of the first and second slits (420a and 420b) on four pixel units is symmetrical. Therefore, the liquid crystal molecules (not shown) in the liquid crystal layer on each pixel unit set 416 have four tilted directions. That is, there are four domains in each pixel unit set 416. Similarly, though two extending directions are illustrated as an example in this embodiment, the alignment direction of a single pixel unit may be changed according to practical requirements.

In view of the above, the pixel unit set of the present invention may be formed by different arrangements and combinations through different numbers of pixel units and extending directions of the slits. Thus, the present invention can provide a high design tolerance of the slits under the requirement of a high resolution and limited process capability, thereby achieving the display effect of wide viewing angle.

Figure 7:
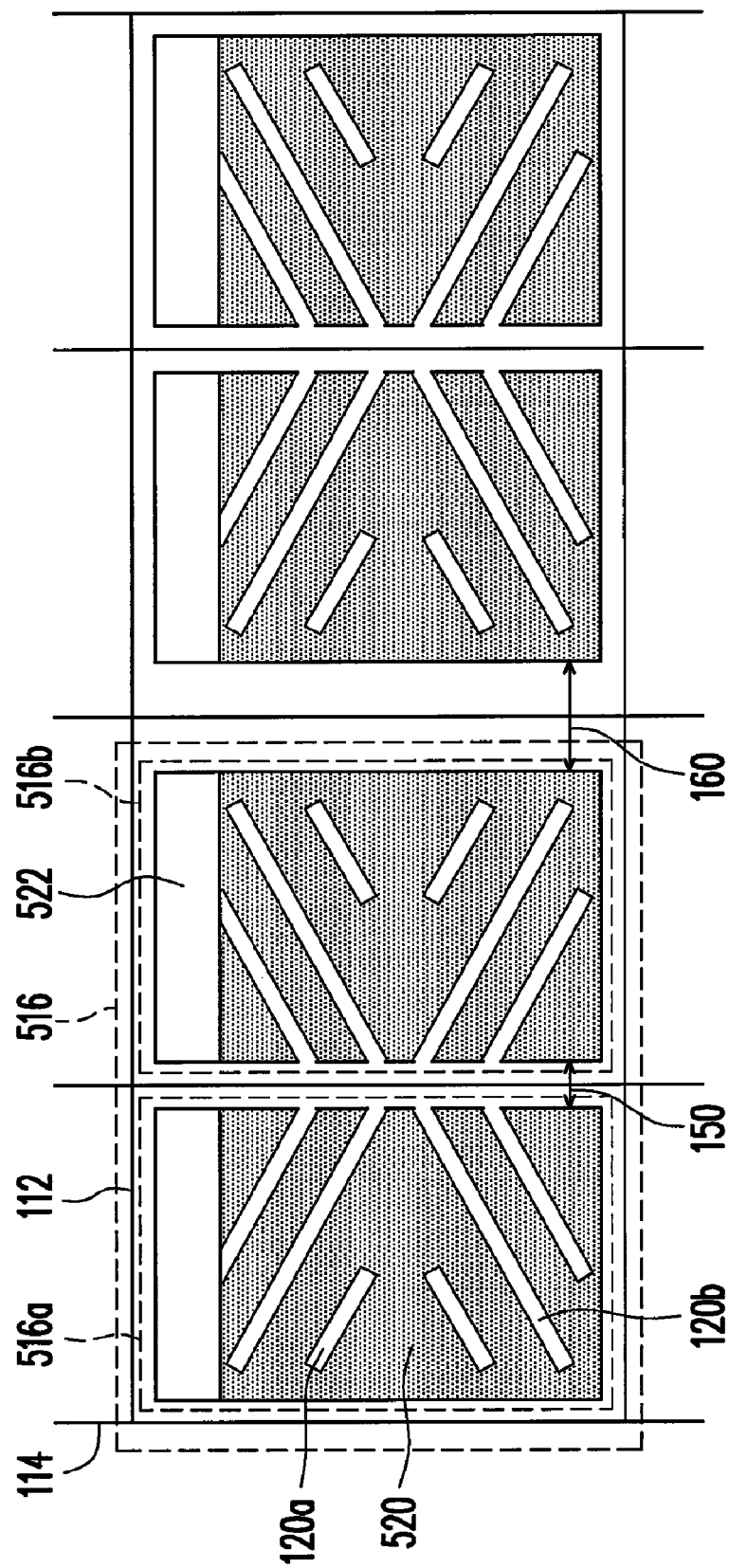
FIG. 7 is a top view of a pixel unit according to another embodiment of the present invention.

The transmissive LCD panel is taken as an example for illustration in the above embodiments. However, the present invention can also be applied to a transflective LCD panel. FIG. 7 is a top view of a pixel unit according to another embodiment of the present invention. The structure and function of the pixel unit in FIG. 7 are similar to those of the pixel unit in FIG. 3, so only the differences will be described below. Referring to FIG. 7, a reflecting pixel electrode 522 is further disposed on each of two pixel units 516a, 516b of a pixel unit set 516. Each reflecting pixel electrode 522 is electrically connected to an active device (not shown). Here, the reflecting pixel electrode 522 and transparent pixel electrode 520 of each of the pixel units 516a, 516b are, for example, respectively corresponding to different cell gaps, so as to control the display gray level of the reflecting region and transmissive region of a pixel, thereby avoiding non-uniform display caused by different display mechanisms (different optical path) in the reflecting region and the transmissive region.

Figure 8:
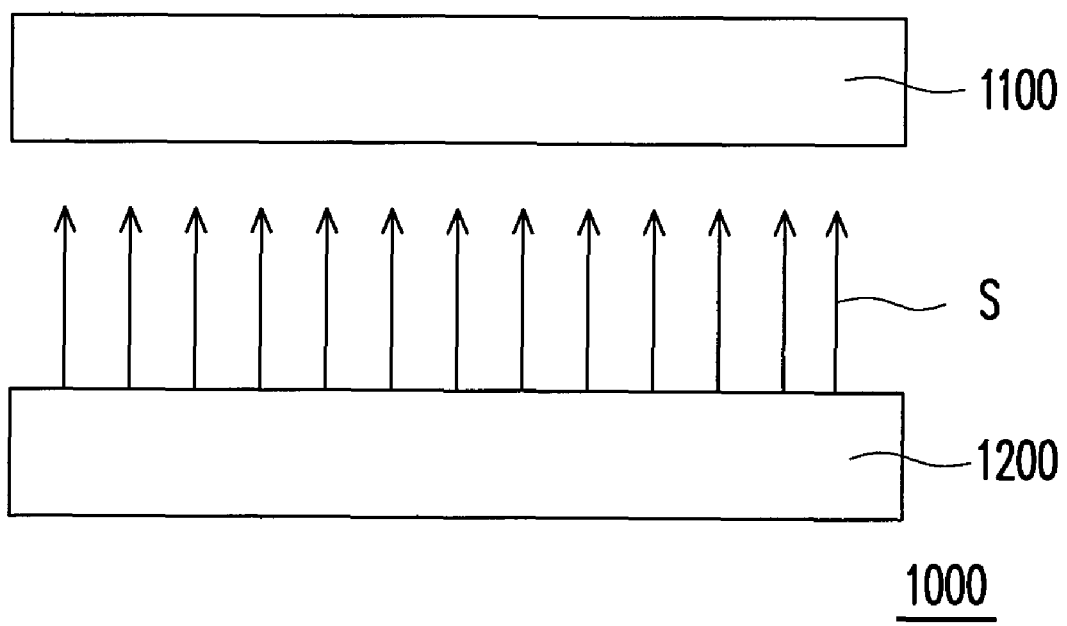
FIG. 8 is a schematic view of an LCD apparatus according to an embodiment of the present invention.

FIG. 8 is a schematic view of an LCD apparatus according to an embodiment of the present invention. Referring to FIG. 8, the LCD apparatus 1000 includes an LCD panel 1100 and a backlight module 1200. The backlight module 1200 is adapted to output a surface light source S to the LCD panel 1100 as a display light source for the LCD panel 1100. Moreover, the design of the structure and the pixel unit of the LCD panel 1100 may be changed similar to the above or other embodiments, so the details will not be described herein again. Further, the backlight module 1200 is a direct type or a side type backlight module, and adopts a cold cathode fluorescence lamp (CCFL), light-emitting diode (LED), or other suitable light sources as a light source.

In view of the above, in the LCD panel and LCD apparatus of the present invention, a plurality of pixel unit sets is designed by the width of the gap between the pixel units, and the slits of different pixel units in a pixel unit set are designed, thereby achieving a multi-domain alignment effect through the combination of the pixel units in the PSA process. In other words, the present invention can provide a high design tolerance of the slits under the requirement of a high resolution and limited process capability, thereby achieving the display effect of wide viewing angle.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:
1. A liquid crystal display (LCD) panel, comprising:
   a first substrate;
   a plurality of scan lines, disposed on the first substrate;
   a plurality of data lines, disposed on the first substrate and respectively intersected with the plurality of scan lines;
   a plurality of pixel unit sets, disposed on the first substrate and each pixel unit set comprising a plurality of pixel units disposed along a longitudinal direction of the scan lines, wherein each two adjacent pixel units are separated by one of the scan lines and data lines, and each of the pixel units comprises:
      an active device, electrically connected to one of the scan lines and one of the data lines; and
      a transparent pixel electrode, electrically connected to the active device and comprising a plurality of slits;
   a second substrate, disposed above the first substrate; and
   a liquid crystal layer, disposed between the first substrate and the second substrate;
   wherein a first gap is located between the transparent pixel electrodes of the two adjacent pixel unit sets and provided with a first width direction parallel to the longitudinal direction of the scan lines, a second gap is located between the transparent pixel electrodes of the two adjacent pixel units in each pixel unit set and provided with a second width direction parallel to the longitudinal direction of the scan lines, and the width of the first gap is greater than that of the second gap.

2. The LCD panel as claimed in claim 1, wherein a part of the slits in each pixel unit are connected to the corresponding second gap.

3. The LCD panel as claimed in claim 1, wherein the slits are arranged symmetrically with respect to the corresponding second gap in each of the pixel unit sets.

4. The LCD panel as claimed in claim 3, wherein the slits in each pixel unit set are arranged symmetrically with respect to an axis being perpendicular to the first gap and the second gap.

5. The LCD panel as claimed in claim 4, wherein the angles between the plurality of slits and the axis or the angles between the extension of the plurality of slits and the axis are in the range of 0 degree to 90 degree.

6. The LCD panel as claimed in claim 4, wherein the angles between the plurality of slits and the axis or the angles between the extension of the plurality of slits and the axis are in the range of 0 degree to 45 degree.

7. The LCD panel as claimed in claim 4, wherein the angles between the plurality of slits and the axis or the angles between the extension of the plurality of slits and the axis are 0 degree.

8. The LCD panel as claimed in claim 3, wherein each of the pixel unit sets comprises a first pixel unit and a second pixel unit, and the slits of the first pixel unit and the slits of the second pixel unit are arranged symmetrically with respect to the corresponding second gap there-between.

9. The LCD panel as claimed in claim 3, wherein each of the pixel unit sets comprises a first pixel unit, a second pixel unit, a third pixel unit, and a fourth pixel unit arranged in sequence, the slits of the second pixel unit and the slits of the third pixel unit are arranged symmetrically with respect to the second gap there-between, and the slits of the first pixel unit and the slits of the fourth pixel unit are arranged symmetrically with respect to the second gap between the second pixel unit and the third pixel unit.

10. The LCD panel as claimed in claim 1, further comprising at least one polymer layer disposed on at least one of the first substrate and the second substrate, wherein the polymer layer is made from the monomers added in the liquid crystal layer treated by a UV curing or heat curing process.

11. The LCD panel as claimed in claim 10, further comprising at least one alignment layer disposed at least between the first substrate and the polymer layer or between the second substrate and the polymer layer.

12. The LCD panel as claimed in claim 1, wherein each of the pixel units further comprises a reflective pixel electrode electrically connected to the corresponding active device.

13. A liquid crystal display (LCD) panel, comprising:
a first substrate;
a plurality of scan lines, disposed on the first substrate;
a plurality of data lines, disposed on the first substrate and respectively intersected with the plurality of scan lines;
a plurality of pixel unit sets, disposed on the first substrate and each pixel unit set comprising a plurality of pixel units disposed along a longitudinal direction of the scan lines, wherein the pixel units are defined by the substantially intersected scan lines and data lines, and each of the pixel units comprises:
an active device, electrically connected to one of the scan lines and one of the data lines; and
a transparent pixel electrode, electrically connected to the active device and comprising a plurality of slits;
a second substrate, disposed above the first substrate; and
a liquid crystal layer, disposed between the first substrate and the second substrate;
wherein the transparent pixel electrodes of different pixel units are electrically connected to different data lines, a first gap is located between the transparent pixel electrodes of the two adjacent pixel unit sets and provided with a first width direction parallel to the longitudinal direction of the scan lines, a second gap is located between the transparent pixel electrodes of the two adjacent pixel units in each pixel unit set and provided with a second width direction parallel to the longitudinal direction of the scan lines, and the width of the first gap is greater than that of the second gap.

* * * * *